United States Patent [19]

Swisher, Jr.

[11] Patent Number: 5,529,434

[45] Date of Patent: Jun. 25, 1996

[54] PAVING MATERIAL MACHINE HAVING HOPPER CAPACITY AND COMPENSATING TUNNEL CAPACITY

[76] Inventor: George W. Swisher, Jr., 1500 Dorchester Dr., Oklahoma City, Okla. 73120

[21] Appl. No.: 451,619

[22] Filed: May 26, 1995

Related U.S. Application Data

[63] Continuation of Ser. No. 44,849, Apr. 8, 1993, abandoned.

[51] Int. Cl.⁶ .................................................. E01C 19/12
[52] U.S. Cl. .......................................... 404/108; 404/84.05
[58] Field of Search ............................... 404/84.05, 84.1, 404/101, 108, 110, 118, 91, 104

[56] References Cited

U.S. PATENT DOCUMENTS

| | | | |
|---|---|---|---|
| 2,911,892 | 11/1959 | Pollitz | 94/46 |
| 3,585,912 | 6/1971 | Danielsson | 404/108 X |
| 3,678,817 | 7/1972 | Martenson et al. | 94/46 |
| 3,680,451 | 8/1972 | Birtchet | 404/104 |
| 3,774,401 | 11/1973 | Allen | 404/84.05 X |
| 3,848,690 | 11/1974 | Hawkins | 404/84.05 X |
| 3,997,277 | 12/1976 | Swisher, Jr. et al. | 404/84 |
| 4,290,820 | 9/1981 | Swisher, Jr. et al. | 134/6 |
| 4,346,548 | 8/1982 | Atkinson | 56/119 |
| 4,818,139 | 4/1989 | Brock et al. | 404/108 X |
| 5,002,426 | 3/1991 | Brown et al. | 404/118 X |
| 5,015,120 | 5/1991 | Brock et al. | 404/108 |
| 5,035,534 | 7/1991 | Brock et al. | 404/81 |
| 5,073,063 | 12/1991 | Brown | 404/101 |
| 5,178,484 | 1/1993 | Strunk | 404/91 X |
| 5,232,305 | 8/1993 | Bassett et al. | 404/101 |

FOREIGN PATENT DOCUMENTS 2534387  2/1977  Germany ................................ 404/108

Primary Examiner—Ramon S. Britts
Assistant Examiner—James A. Lisehora
Attorney, Agent, or Firm—Dunlap & Codding

[57] ABSTRACT

A paving material machine having a frame with an end-to-end tunnel for paving material capacity. The machine also includes an electro-hydraulic drive system using rotary transducers. In a configuration for laying down paving material, the machine has a front hopper for receiving paving material from trucks and a conveyor to transfer paving material rearward through the tunnel. A diverter plate and feed augers are mounted at the rear of the machine to regulate the paving material out of the rear of the tunnel. A lay down screed is located behind the feed augers. In order to improve turning characteristics in a system featuring a positive traction device, the drive system is connected to rotary transducers which measure the direction and degree of wheel turn. Using the input from the rotary transducers, the drive system allows a speed differential between the inside and outside wheels in a turn. In an alternate lay down machine embodiment, a windrow pickup assembly is substituted for the hopper and a pair of tunnel side forms are used in place of the conveyor. The frame having a tunnel and the drive system using rotary transducers may be utilized in a paving material transfer machine or a road widening machine.

4 Claims, 5 Drawing Sheets

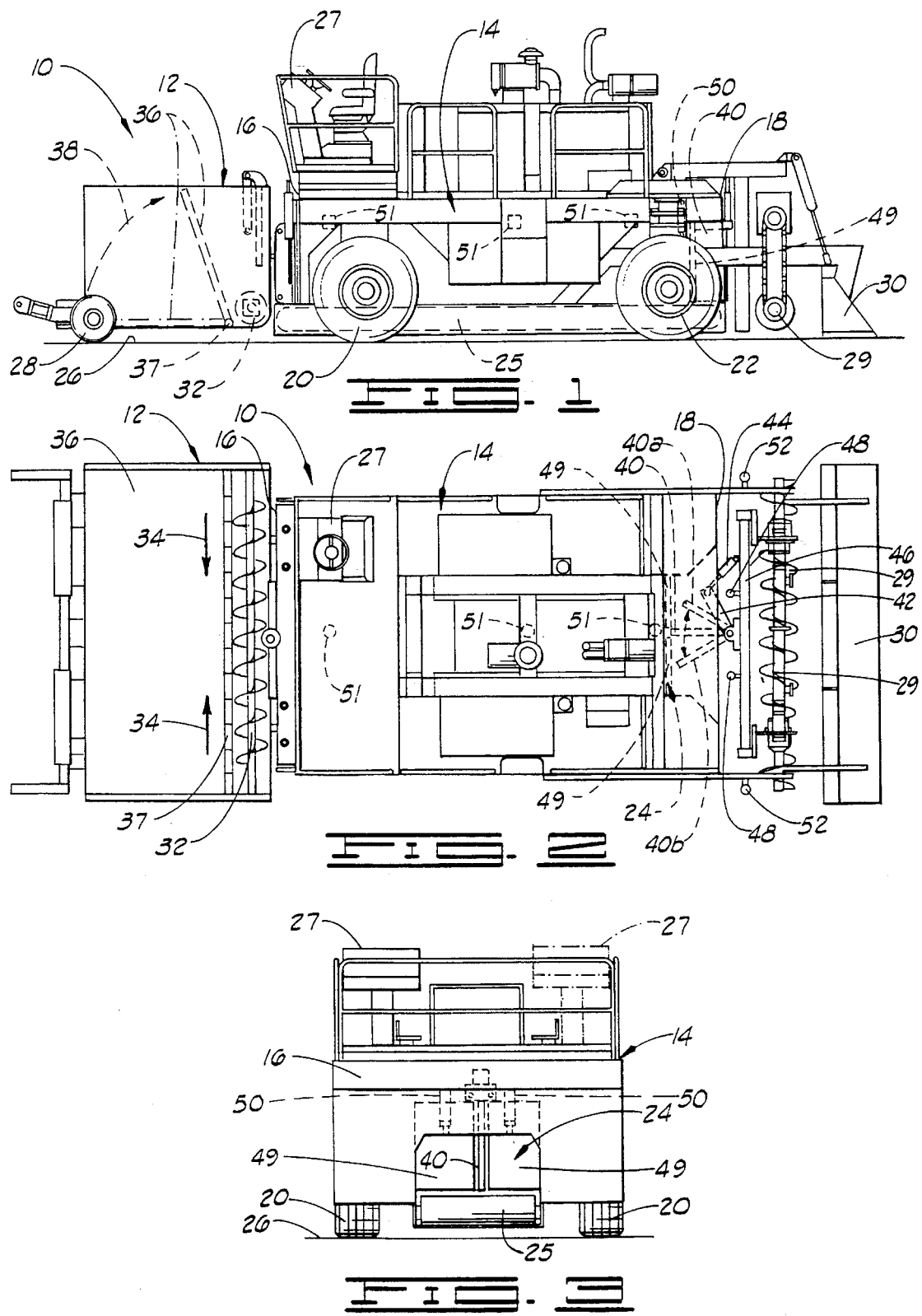

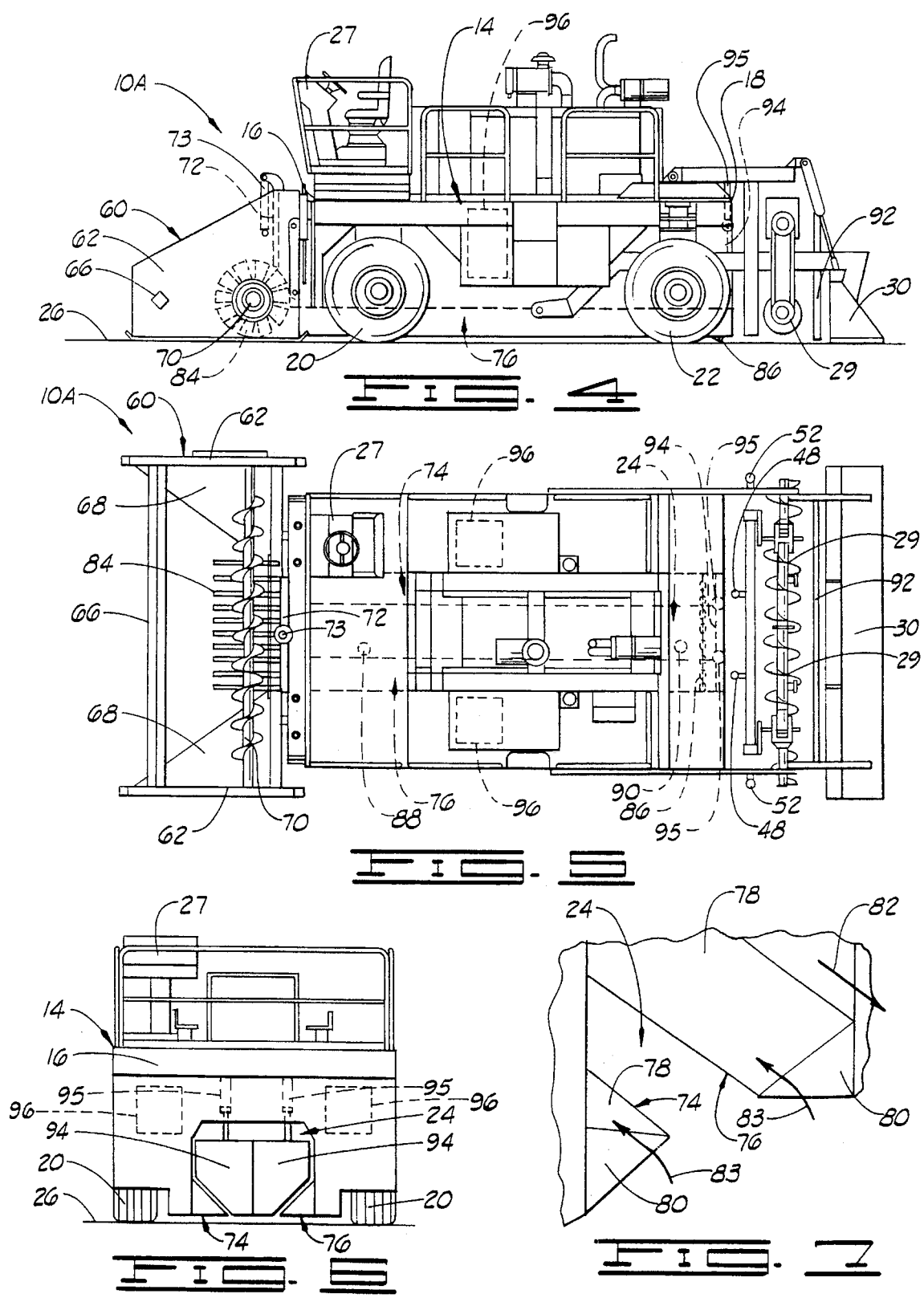

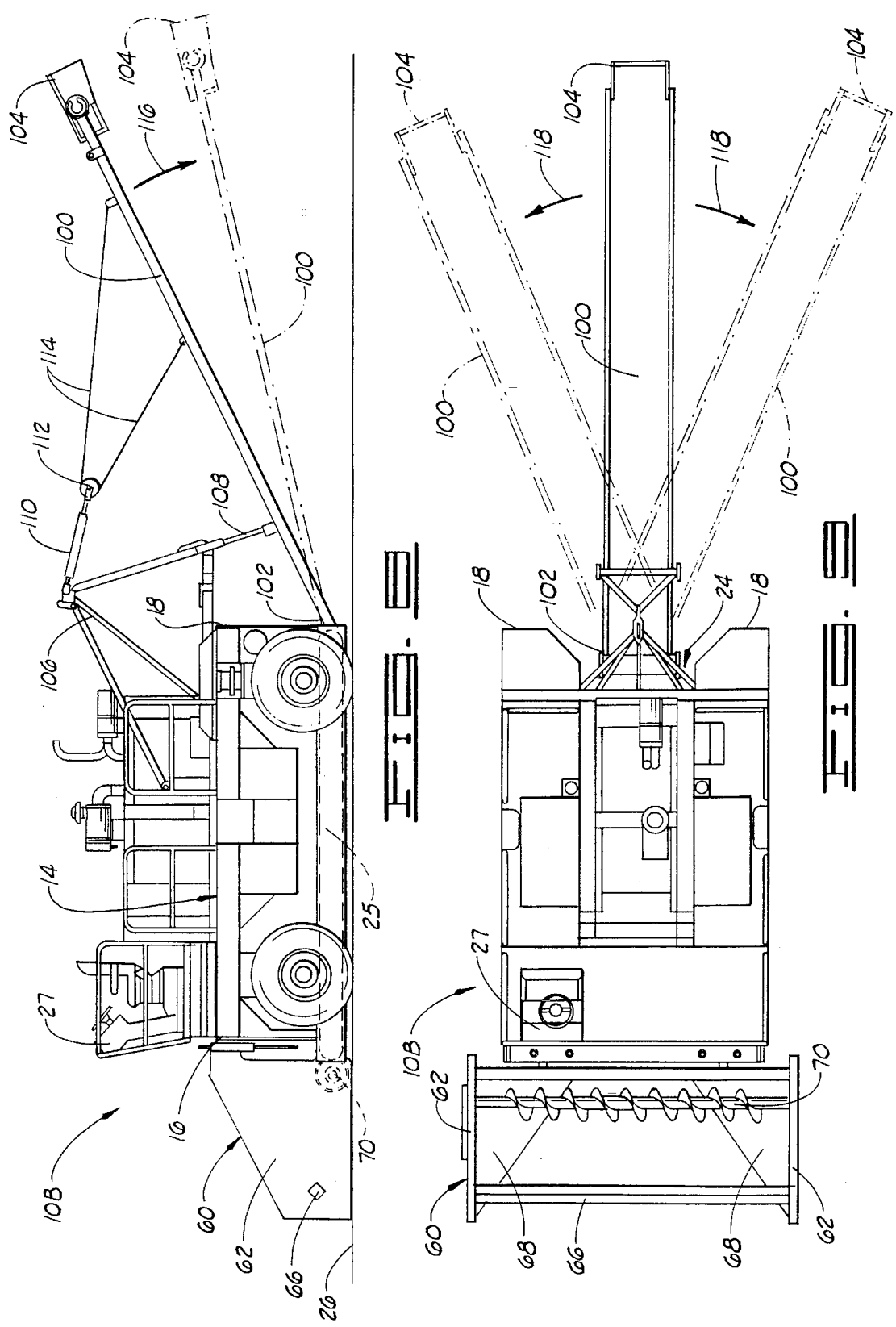

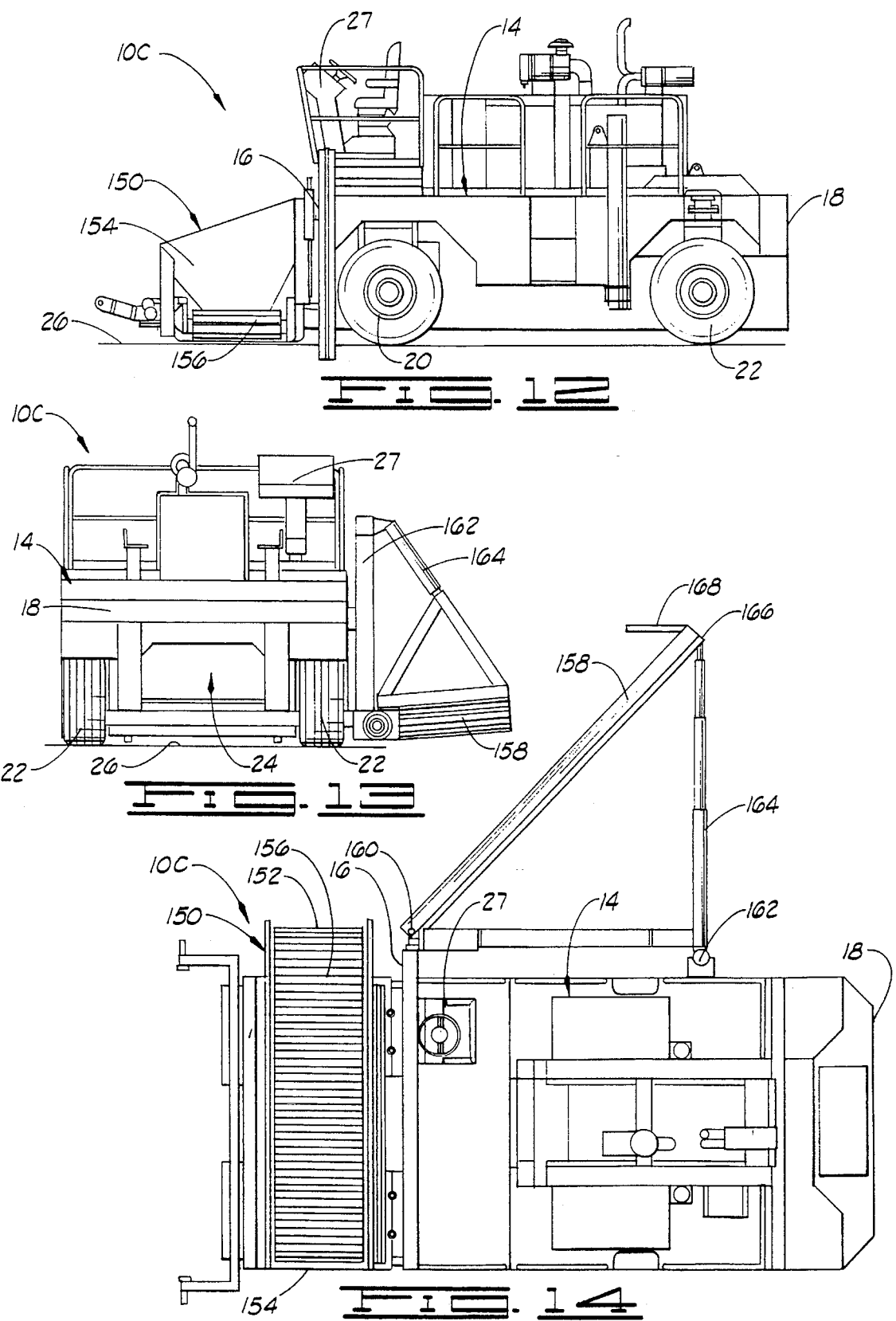

PAVING MATERIAL MACHINE HAVING HOPPER CAPACITY AND COMPENSATING TUNNEL CAPACITY

This is a continuation of application Ser. No. 08/044,849 filed on Apr. 8, 1993, now abandoned.

BACKGROUND OF THE INVENTION

1. Field of the Invention

The present invention relates to machines for receiving, distributing and laying down paving material.

2. Description of Related Art

In building and rebuilding roads, paving material is typically delivered to the work-site by truck. Often the trucks dump the paving material directly into receiving hoppers of the road construction machines. In some cases, the paving material is windrowed on the surface by the trucks and the road construction machines pick up the windrow of paving material.

Whether the paving material is dumped into hoppers or windrowed, a problem exists in balancing the delivery of paving material by the trucks with the use of the paving material by the road construction machines. Increasing the capacity of receiving hoppers the road construction machines is one way to address this problem. Of course, there are practical limits on the length and width of such hoppers. In some machines, the capacity of the receiving hopper has been increased by extending the hopper walls vertically. Vertical extension of the hopper, however, creates problems in dumping paving material into the hopper.

Another problem relates to the traction of such machines. Small wheels or hard rubber bogies are often used for the front wheels and large wheels are typically mounted at the rear. The paving material load on the machine may place a substantially amount of the weight on the front wheels Such machines may be equipped with four-wheel drive, but the weight may cause small front tires to sink and lose traction.

Yet another difficulty relates to the four-wheel drive system itself. Positive traction electro-hydraulic systems are in use to control drive to each wheel based upon the rotational speed of each wheel. When the machine is in a turn, however, the hydraulic flow to each wheel cannot be equalized in order to achieve optimal traction.

The outside wheel in a turn has to travel a greater distance than the inside wheel. If the hydraulic flow to each wheel is equalized, then the inside wheels and the outside wheels would not be forced to make the turn in the same amount of time. One problem with traction in turns, therefore, is how to make the inside wheels and outside wheels cover their respective distances in the same amount of time.

SUMMARY OF THE INVENTION

The present invention is a road construction machine having a frame with a tunnel extending from the front to the rear of the frame. The tunnel provides a surge capacity for paving material in addition to the capacity provided by a receiving hopper or a windrow pickup assembly.

In order to achieve improved traction, the present invention includes uniformly sized front and rear wheels and a modification of a conventional positive traction electro-hydraulic system. A pair of rotary transducers is provided to monitor the turning angle of the front and rear wheels of the road construction machine. The turning angle input is used to allow the outside wheel to speed up and the inside wheel to slow down when the machine is in a turn.

One object of the present invention is to provide a machine with a tunnel having paving material capacity to substantially increase the overall paving material capacity of the machine.

Another object of the present invention is to provide a machine which transfers paving material without the use of high-wear components such as drag slat conveyors.

Another object of the present invention is to provide a machine which transfers paving material by remixing to prevent segregation of the aggregate making up the paving material.

Yet another object of the present invention is to provide a paving material machine with uniformly sized wheels to ensure good traction regardless of weight distribution on the machine. It is also an object of the present invention to adjust wheel speeds in turns to improve turning traction of the machine.

Still another object of the present invention is to provide a machine with an operator's console at the front so that an operator of the machine is able to supervise the loading of the machine with paving material.

Other objects, features and advantages of the present invention are apparent from the following detailed description when read in conjunction with the accompanying drawings and appended claims.

BRIEF DESCRIPTION OF THE DRAWINGS

FIG. 1 is a side elevation of a front hopper paving material lay down machine constructed in accordance with the present invention.

FIG. 2 is a top plan view of the lay down machine of FIG. 1.

FIG. 3 is a partly diagrammatical front elevation of the lay down machine of FIG. 2 as viewed from behind the hopper.

FIG. 4 is a side elevation of a windrow pickup paving material lay down machine constructed in accordance with the present invention.

FIG. 5 is a top plan view of the lay down machine of FIG. 4.

FIG. 6 is a partly diagrammatical, front elevation of the lay down machine of FIG. 5 as viewed from behind the windrow pickup assembly.

FIG. 7 is perspective view of a front portion of the frame, tunnel and tunnel side forms of the lay-down machine of FIG. 4.

FIG. 8 is a side elevation of a paving material transfer machine constructed in accordance with the present invention.

FIG. 9 is a top plan view of the transfer machine of FIG. 8.

FIG. 12 is a side elevation of a road widening machine constructed in accordance with the present invention.

FIG. 13 is a rear elevation of the road widening machine of FIG. 12.

FIG. 14 is a top plan view of the road widening machine of FIG. 12.

DETAILED DESCRIPTION OF THE PREFERRED EMBODIMENTS

Figure 10:
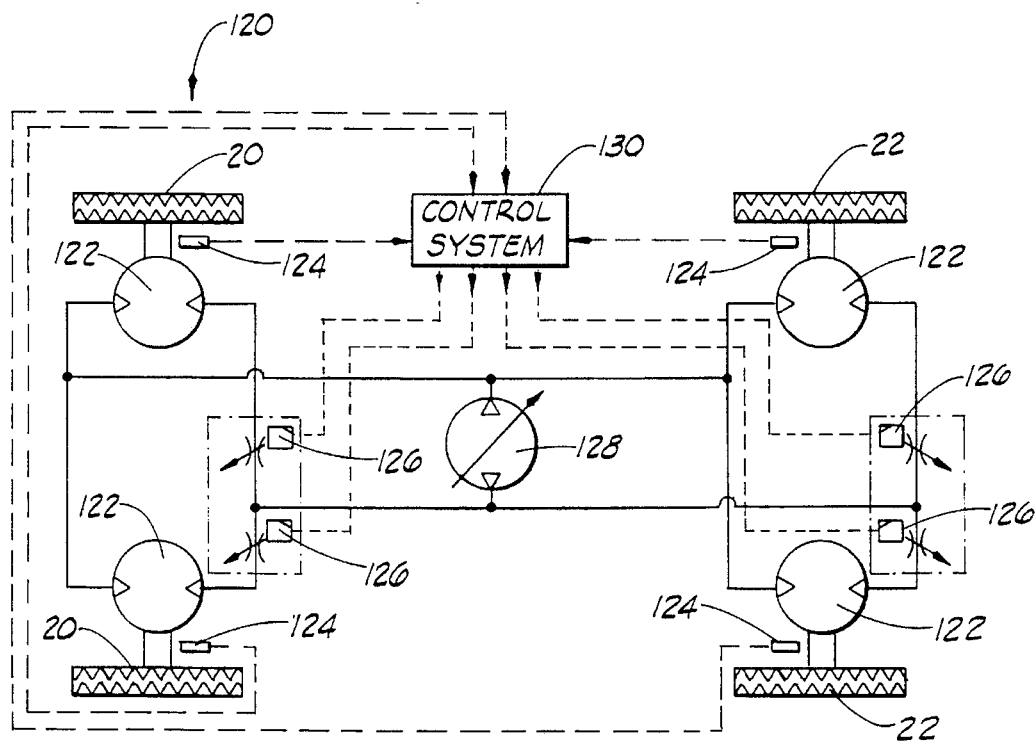
FIG. 10 is a schematic diagram of a prior art electro-hydraulic control system.

Referring to the drawings in general, and to FIGS. 1 through 3 in particular, shown therein and designated by the general reference numeral 10 is a paving material lay down machine with a front hopper 12.

The machine 10 includes a frame 14 having a front end 16 and a rear end 18. Sets of front wheels 20 and rear wheels 22 support the front end 16 and rear end 18 of the frame 14, respectively.

A tunnel 24, which is open at both ends, extends through the frame 14 from the front end 16 to the rear end 18 of the frame 14. A transfer conveyor 25 is rotatably mounted in a lower portion of the tunnel 24 and extends substantially throughout the length of the tunnel 24. As best shown in FIG. 3, the transfer conveyor 25 is a belt conveyor, as opposed to a drag slat conveyor, and extends continuously across the width of the tunnel 24. By eliminating drag slat conveyors, which are high wear and high maintenance components, the cost of maintaining the machine 10 is greatly lessened.

It should be appreciated that the machine 10 includes a conventional engine and drive, steering and operating controls for propelling the machine 10 over a surface 26. It should also be noted that the front wheels 20 and the rear wheels 22 are uniform in size to bear the load effectively no matter how the weight is distributed over the machine 10. The wheels 20 and 22 typically comprise high-pressure inflatable tires, rated in the range of 115 psi.

An operator's console 27 is provided for an operator of the machine 10. As best shown in FIG. 3, the operator's console 27 is adapted to be positioned at a variety of locations across the frame 14. With this construction, the operator may move the console 27 to a position anywhere between one side (console 27 of FIG. 3 in solid lines) and the other side (console 27 of FIG. 3 in broken lines). The best position of the console 27 for viewing of the operation by the operator varies depending on how the machine 10 is being used with other road construction vehicles.

The operator of paving machines are often positioned at the rear to oversee the paving operation taking place. In the case of the present invention, the material level sensing and controls described hereinbelow allow the operator to be toward the front of the machine 10 to supervise the material loading.

The hopper 12 has an open top for receiving paving material from a truck or conveyor. A transfer opening in the rear wall of the hopper 12 mates with the front opening of the tunnel 24 for transfer of paving material from the hopper 12 into the tunnel 24 of the frame 14. A set of hopper wheels 28 support the hopper 12 for movement over the surface 26.

A pair of feed augers 29 are mounted behind the rear opening of the tunnel 24 to evenly distribute paving material across the surface 26. A lay down screed 30 is provided to the rear of the feed augers 29 to produce an even, uniform surface of pavement.

A transfer auger 32 is rotatably mounted across a lower rear portion of the hopper 12 to urge paving material into the tunnel 24 through the transfer opening of the hopper 12. It should be appreciated that the flighting of the transfer auger 32 is one-half left-handed and one-half right-handed to force paving material toward the rear center of the hopper 12, as indicated by direction arrows 34. By augering material into the tunnel 24, the material is re-mixed to prevent segregation and thereby maintain a uniform mixture.

Even with augering, segregation may occur when the quantity of paving material in the hopper 12 reaches a low level. With the hopper 12 about one-third or one-fourth full, larger aggregate tends to tumble to the sides of the hopper 12 and augering may not compensate for this segregation.

In order to reduce the segregation associated with a low volume of paving material in the hopper 12, a hopper plate 36 is pivotally mounted on hinges 37 to the bottom of the hopper 12. As illustrated by direction arrow 38 in FIG. 1, the hopper plate 36 is pivoted from the bottom of the hopper 12 to an angular position to feed the last one-third or one-fourth of the paving material more uniformly into the transfer auger 32. Electric, hydraulic, pneumatic or any other suitable power and controls (not shown) may be utilized to pivot the hopper plate 36 between the bottom of the hopper 12 and the feed position.

At the rear of the machine 10, a diverter paddle 40 is pivotally mounted to extend into the rear of the tunnel 24. An actuating arm 42 and cylinder 44 are connected to the diverter paddle 40 to locate the diverter paddle 40 into one of a range of positions between those designated by reference characters 40a and 40b. As best shown in FIGS. 1 and 3, the diverter paddle 40 extends from the top of the tunnel 24 almost all the way to the transfer conveyor 25.

A support assembly 46 is mounted to the frame 14 and two feed sensors 48 are attached to the front of the support assembly 46 behind the diverter paddle 40. The feed augers 29 are mounted directly behind the feed sensors 48. The feed sensors 48 are spaced apart with one feed sensor 48 toward each side of the tunnel 24 to read the level of paving material on the surface 26 in front of the feed augers 29. The readings of the feed sensors 48 are sent to the electro-hydraulic control system of the machine 10 to balance the level of paving material in front of the feed augers 29 by adjusting the position of the diverter paddle 40.

A further control feature consists of two vertical gates 49 mounted to the frame 14 at the rear of the tunnel, one rear gate 49 to the side of the center line of the conveyor 25. Each rear gate 49 is moved up and down by a corresponding rear gate cylinder 50. The amount of mix distributed to each screed auger 29 may be controlled by the diverter paddle 40, by the rear gates 49 or by the combination of the rear gates 49 and the diverter paddle 40.

The two rear gates 49 are controlled independently by the feed sensors 48. By metering the amount of material being distributed to the augers 29, the rear gates 49 allow the conveyor 25 to run until the mix has accumulated in the tunnel 24 to a level measured by a plurality of level sensors 51 located along the length of the tunnel 24. The output signals from the tunnel level sensors 51 is processed by the control system to start or stop the conveyor 25 if the material level at either end or at the center of the tunnel 24 is below or above the desired preset level.

In similar fashion, two screed sensors 52 are mounted to opposite sides of the frame 14 in front of the feed augers 29. The screed sensors 52 read the level of paving material in front of the feed augers 29 to maintain a desired "head" of paving material for the screed 30. The readings of the screed sensors 52 are sent to the electro-hydraulic system of the machine 10 to operate the feed augers 29.

For example, if the level of paving material being fed to the left side of the machine 10 is insufficient, the feed auger 29 on the left side is operated to feed more paving material to the left side. Similarly, the feed auger 29 on the right side is operated when the level of paving material being distributed to the right side is inadequate.

With reference now to FIGS. 4 through 7, shown therein is another embodiment of a paving material lay down machine, designated generally by reference character 10A. The machine 10A is a lay down machine adapted to pick up a windrow of paving material from the surface 26.

It should be appreciated that the machine 10A includes the same basic wheeled frame 14 with the tunnel 24, electro-hydraulic control system and operator's console 27 as the machine 10. Machine 10A, however, comprises the following components and feature which differ from those of machine 10.

As illustrated by FIGS. 4 and 5, the machine 10A includes a windrow pickup assembly 60 mounted to the front end 16 of the frame 14. The windrow pickup assembly 60, which is open in front, top and bottom, includes two sides 62 which are supported by a cross member 66. From each side 62, a side member 68 angles downward and inward to channel paving material toward the rear center of the windrow pickup assembly 60.

A windrow auger 70 is rotatably mounted between the sides 62 of the windrow pickup assembly 60 to feed paving material toward the center of the windrow pickup assembly 60. From the center of the windrow auger 70 to one end 62, the flights of the windrow auger 70 are left-handed to urge paving material toward the center as the windrow auger 70 is rotated. Similarly, from the center of the windrow auger 70 to the opposite end 62, the flights are right-handed also to feed paving material toward the center as the windrow auger 70 is rotated.

The rear wall of the windrow pickup assembly 60 has a discharge opening which communicates with the tunnel 24 of the machine 10A. A front gate 72 is mounted over the discharge opening of the windrow pickup assembly 60. A front gate actuating cylinder 73 is operatively connected to the front gate 72 to open and close the front gate 73 for regulating the amount of paving material being transferred from the windrow pickup assembly 60 into the tunnel 24.

As illustrated by FIGS. 6 and 7, a pair of tunnel side forms 74 and 76 are located within the tunnel 24. The tunnel side forms 74 and 76 extend from the frame 14 and oppose one another in a lower portion of the tunnel 24 substantially throughout the length of the tunnel 24.

As best shown in FIG. 7, each tunnel side form 74 and 76 angles downward and inward into the tunnel 14 to define an angled upper surface 78 for supporting a portion of the paving material within the tunnel 24. In addition, each tunnel side form 74 and 76 includes a front face 80 which angles upward and rearward into the tunnel 24. As the machine 10A moves forward, as indicated by direction arrow 82 in FIG. 7, an upper portion of the windrowed paving material is carried up and over the front faces 80 of the tunnel side forms 74 and 76. As indicated by direction arrows 83 in FIG. 7, the front faces 80 of the tunnel side forms 74 and 76 direct paving material onto the upper surfaces 78 of the tunnel side forms 74 and 76. In this manner, the tunnel side forms 74 and 76 slice through the windrowed paving material and reduce the load imposed on the machine 10A by plowing through the windrow.

As best illustrated by FIG. 6, a lower layer of the windrow remains on the surface 26 beneath and between the tunnel side forms 74 and 76. The weight of the windrow upon this lower layer may compact the lower layer and adversely affect the uniformity of the paving material.

In order to solve this lower layer compaction problem, a plurality of stirring paddles are mounted to the windrow auger 70 (FIGS. 4 and 5). One of the stirring paddles is designated by reference numeral 84 and is generally representative of the stirring paddles. As shown most clearly in FIG. 4, the stirring paddles 84 extend substantially to the surface 26 to stir up the lower layer of paving material as the windrow auger 70 is rotated.

As best shown in FIGS. 4 and 5, a chain 86 may provide an additional solution to the lower layer compaction problem. The chain 86 is suspended from the frame 14 or tunnel side forms 74 and 76 at the rear of the tunnel 24 with enough slack to drag through the lower layer of the windrowed paving material. By trailing through the lower layer of the paving material, the chain 86 breaks up compaction in the lower layer.

From the operator's console 27, the operator of the machine 10A cannot see the level of paving material within the tunnel 24. Therefore, a plurality of tunnel sensors are mounted within the tunnel to read the level of paving material at various points within the tunnel 24.

For example, as illustrated by FIG. 5, a front tunnel sensor 88 and a rear tunnel sensor 90 are mounted in the tunnel 24 to read the level of paving material at those two points in the tunnel 24. Typically, the electro-hydraulic control system receives the readings of the tunnel sensors 88 and 90, takes an average of the readings and automatically adjusts the position of the front gate 72 according to the average level of paving material within the tunnel 24. It should be understood that any number of tunnel sensors may be used and that number of tunnel sensors utilized typically depends on the length of the tunnel 24.

It should be appreciated that machine 10A includes feed augers 29, lay down screed 30, feed sensors 48 and screed sensors 52 like those described hereinabove for machine 10. In addition, machine 10A includes a rear strike-off plate 92 mounted between the feed augers 29 and the lay down screed 30. The rear strike-off plate 92 extends across the width of the machine 10A and is moveable through a range of positions for striking off various levels of paving material immediately in front of the lay down screed 30. The rear strike-off plate 92 is operatively connected to the electro-hydraulic system of the machine 10A to allow the operator to select a desired strike-off level.

The amount of paving material leaving the rear opening of the tunnel 24 is regulated by a pair of rear gates 94. As best shown in FIG. 6, a pair of rear gate actuating cylinders 95 are connected to the frame 14 and the rear gates 94 to control the position the rear gates 94. By operating the rear gate cylinders 95 to move the rear gates 94 up or down, the amount of paving material being transferred to each of the feed augers 29 is controlled.

The rear gate cylinders 95 are connected to the electro-hydraulic control system of the machine 10A. The paving material level readings of the feed sensors 48 are utilized by the electro-hydraulic control system for automatic positioning of the rear gates 94 by operating the rear gate cylinders 95. This operation has been described hereinabove.

In the windrow operation of machine 10A, there is no weight toward the front end 16 from a receiving hopper. Accordingly, the machine 10A tends to have uneven weight distribution, with more weight toward the rear 18 than toward the front 16. This load imbalance may adversely affect the traction of the front wheels 20.

To correct the weight distribution, a plurality of weights 96 may be mounted to the frame 14 of the machine 10A. As illustrated by FIGS. 4 through 6, the weights 96 are typically placed more toward the front wheels 20 than the rear wheels 22 and on each side of the frame 14. By placing more weight toward the front, improved traction and stability is provided to the front wheels 20. It should be appreciated, however, that compensating weights may be mounted at any points on the machine 10A to balance the overall load carried by the machine 10A.

Turning now to FIGS. 8 and 9, shown therein and designated by reference numeral 10B is a machine for transferring paving material. The machine 10B is constructed to pick up a windrow of paving material and to transfer the paving material to another machine or vehicle.

The machine 10B includes the basic frame 14 with front end 16, rear end 18, tunnel 24 and transfer conveyor 25, as described hereinabove. The windrow pickup assembly 60 previously described is attached to the front end 16 of the frame 14 and a placing conveyor 100 is mounted to the rear end 18. It should be appreciated the hopper 12 described hereinabove may be used in place of the windrow pickup assembly 60 with the machine 10B, if desired.

The placing conveyor 100 has a receiving end 102 and a discharge end 104. The receiving end 102 of the placing conveyor 100 is located to receive paving material from the rear end of the tunnel 24 in the frame 14 of the machine 10B. The discharge end 104 is positioned to feed paving material to another vehicle, such as a laydown machine.

It is desirable for the machine 10B to discharge paving material throughout a range of elevations for transfer of paving material to vehicles having different material receiving heights. Accordingly, the placing conveyor 100 is equipped with a pivotable support structure 106, telescoping suspension bars 108, a height-adjusting cylinder 110 and a pulley 112 with pulley lines 114. With this arrangement, the piston of the cylinder 110 may be extended to lower the discharge end 104 of the placing conveyor 100 or may be retracted to raise the discharge end 104 of the placing conveyor 100. The lower position of the discharge end 104 of the placing conveyor 100 is shown in broken lines and the lowering movement is indicated by the direction arrow 116 in FIG. 8.

The machine 10B should also be able to discharge paving material toward either side as well as directly to the rear of the machine 10B. In order to achieve this function, the placing conveyor 100 is adapted to be positionable throughout a range of orientations from side to side, as indicated by direction arrows 118 in FIG. 9. This construction allows the machine 10B to transfer paving material to another vehicle directly to the rear of the machine 10B or behind and to either side of the machine 10B.

With reference now to FIG. 10, shown therein and designated by reference numeral 120 is a prior art positive traction system for a vehicle. It should be appreciated that the front wheels 20 and rear wheels 22 in FIG. 10 correspond to the front wheels 20 and rear wheels 22 of machines 10, 10A and 10B.

Each front wheel 20 and rear wheel 22 has a corresponding hydraulic motor 122 for driving the wheel 20 or 22 and a corresponding speed sensor 124 for reading the rotational speed of the wheel 20 or 22. The fluid pressure supplied to each hydraulic motor 122 is controlled by a corresponding spool valve solenoid 126.

A master pump 128 is provided to vary the overall fluid pressure and, in turn, the speed of the vehicle. A control system 130 is connected to the speed sensors 124 and the spool valve solenoids 126 to control the fluid pressure to each wheel 20 and 22.

The operation of the prior art hydrostatic drive system 120 is briefly described as follows. The system 120 normally operates with all the spool valves 126 in full open position. The control system 120 receives electric input signals (shown as dashed lines in FIG. 10) from the speed sensors 124. The electric input signals indicate the speed of each wheel 20 and 22.

The control system 120 compares the speeds of each wheel. When the speed difference between two motors exceeds a predetermined value, the control system 120 sends a "slow-down" or "close-valve" electric command signal (shown as dotted lines in FIG. 10) to the spool valve solenoid 126 of the fast motor 122. In response to the electric command signal, the spool valve solenoid 126 closes to a preprogrammed degree and decreases the fluid flow to the fast motor 122.

The control system 120 constantly monitors and adjusts the speeds of the hydraulic motors 122. When one of the wheels 20 or 22 loses traction and speeds up, the system 120 slows down the flow to the slipping wheel and diverts more fluid pressure to the other, non-slipping wheels 20 and 22.

Figure 11:
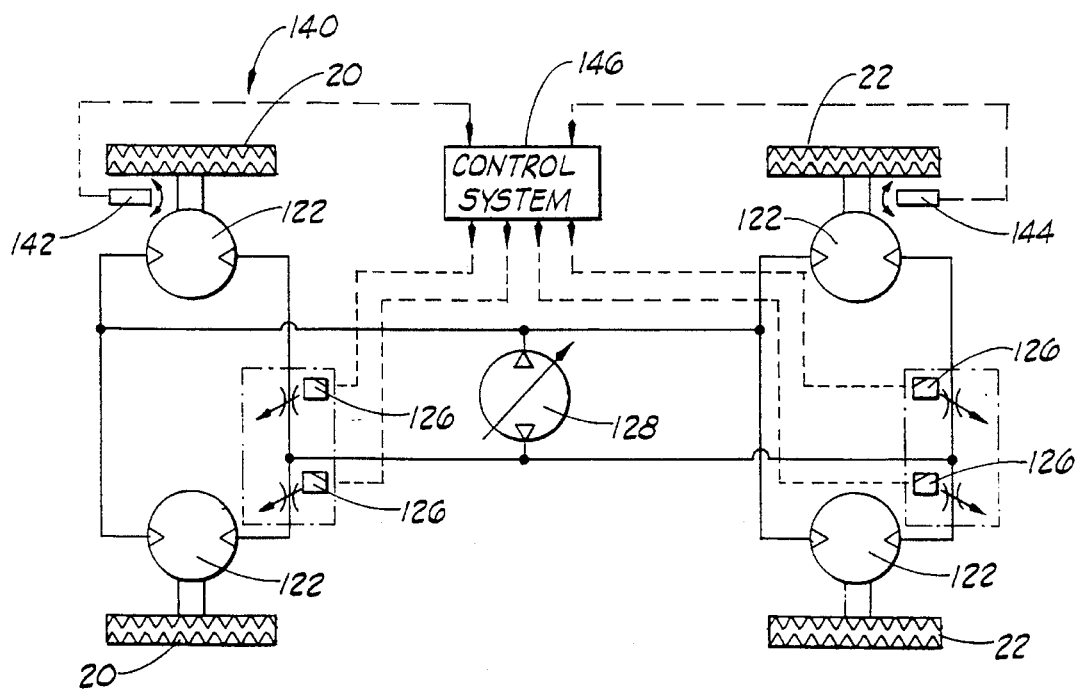
FIG. 11 is a schematic diagram of an electro-hydraulic control system constructed in accordance with the present invention.

Referring to FIG. 11, shown therein and designated by reference numeral 140 is an electro-hydraulic drive system having rotary transducers. Like the prior art system 120, the hydrostatic drive system 140 includes the front wheels 20, the rear wheels 22, hydraulic motors 122, valve spool solenoids 126, electric input signal connections (dashed lines), hydraulic lines (solid lines) and electric commands signal connections (dotted lines).

The system 140, however, has a front rotary transducer 142 detecting the turning position of the front wheels 20 and a rear rotary transducer 144 sensing the turning position of the rear wheels 22. Suitable rotary transducers are known in the art and are commercially available.

The control module 146 is constructed to receive electric input signals from the rotary transducers 142 and 144. When the front wheels 20 are turned, the electric input signal of the front rotary transducer 142 indicates to the control module 146 the direction and degree of turn of the front wheels 20. In relation to the direction and degree of turn of the front wheels 20, the control module 146 sends an electric input signal to close, by a preprogrammed amount, the spool valve 126 of the front wheel 20 on the inside of the turn. With this design, a portion of the fluid flow to the hydraulic motor for the inside front wheel is allowed to transfer to the outside wheel 20 and the speed of the inside front wheel 20 is thereby reduced and the speed of the outside front wheel 20 is increased throughout the turn of the machine.

The inside rear wheel 22 is allowed to slow down during a turn of the rear wheels 22 in the same manner as that just described for the front wheels 20. It should be appreciated that the hydrostatic drive system 140 may be used for the front wheels only, the rear wheels only or for both the front and the rear wheels. The drive system 140 also may be adapted for use with a three-wheeled vehicle instead of a four-wheeled vehicle. Moreover, the hydrostatic drive system 140 may be used with a vehicle propelled by three or four tracks rather than wheels.

Turning to FIGS. 12 through 14, shown therein and designated by reference numeral 10C is a paving material machine for widening a road. It should be appreciated that the machine 10C is configured from the frame 14 having the tunnel 24 as described hereinabove. In addition, the machine 10C typically includes the electro-hydraulic drive system 140 just described.

A side-conveying hopper 150 adapted to receive paving material from transport trucks is mounted to the front 16 of the machine 10C. The hopper 150 has side plates which may be removed so that paving material can be conveyed out one of either sides of the hopper 150. In FIG. 14, for example, one side 152 of the hopper 150 is open to convey out paving material and the opposite side 154 is closed.

A transverse conveyer 156 is rotatably mounted at the bottom of the hopper 150 to move paving material out of the hopper 150. The rotation of the transverse conveyor 156 is typically reversible for conveying paving material out of the hopper 150 to one of either sides 152 and 154 of the hopper 150.

As best shown in FIGS. 13 and 14, the machine 10C includes a blade 158 which is side-mounted to the frame 14 from a front post 160 and a rear post 162. A rear cylinder 164 is located between the rear post 162 and the distal end 166 of the blade 158 to adjust the height of the blade 158. In addition, the front post 160 is adapted to be raised and lowered to adjust the front elevation of the blade 158.

A retaining plate 168 is attached to the distal end 166 of the blade 158 to retain the paving material in front of the blade 158. The retaining plate 168 also serves to maintain a head of paving material for the blade 158 to level off.

In operation, paving material is dumped into the hopper 150 from transport trucks and the paving material is conveyed out of the open side of the hopper 150. The speed of the transverse conveyor 156 regulates the discharge rate of the paving material. The operator sets the elevation of the blade 158 to distribute the desired depth of paving material to the side of the machine 10C.

Vehicles like the machine 10C are often required to make tight turns. The electro-hydraulic drive system 140 provides substantially equal traction to the inside and outside wheels when the machine 10C is turned.

Changes may be made in the combinations, operations and arrangements of the various parts and elements described herein without departing from the spirit and scope of the invention as defined in the following claims.

What is claimed is:

1. A paving material machine comprising:

a frame having a front end, a rear end and a pair of sidewalls defining a tunnel extending from the front end to the rear end thereof, the tunnel having a capacity for providing a first volume of paving material, the first volume of paving material being dependent upon the level of paving material within the tunnel;

a hopper mounted to the frame and communicating with the tunnel at the front end of the frame, the hopper being adapted to receive a second volume of paving material;

auger means within the hopper and conveyor means within the tunnel for transferring paving material from the hopper through the tunnel such that the first volume of paving material in the tunnel is more constant than the second volume of paving material in the hopper; and gate means mounted to the frame at the rear end of the frame for allowing a selected amount of paving material to exit the tunnel such that the selected amount of paving material may be independent of the level of paving material in the tunnel.

2. The paving material machine of claim 1 further comprising:

a distributing auger mounted to the frame behind the gate means, the distributing auger being adapted for spreading the selected amount of paving material across a surface to be paved.

3. The paving material machine of claim 2 further comprising:

a lay down screed mounted to the frame behind the distributing auger, the lay down screed being adapted to produce an even grade of the paving material on the surface.

4. The machine of claim 1 wherein the sidewalls defining the tunnel are substantially vertical and the belt conveyor is substantially horizontal such that the belt conveyor carries paving material through the tunnel substantially en masse to maintain the paving material in a remixed condition.

\* \* \* \* \*